United States Patent Office 3,440,410
Patented Apr. 22, 1969

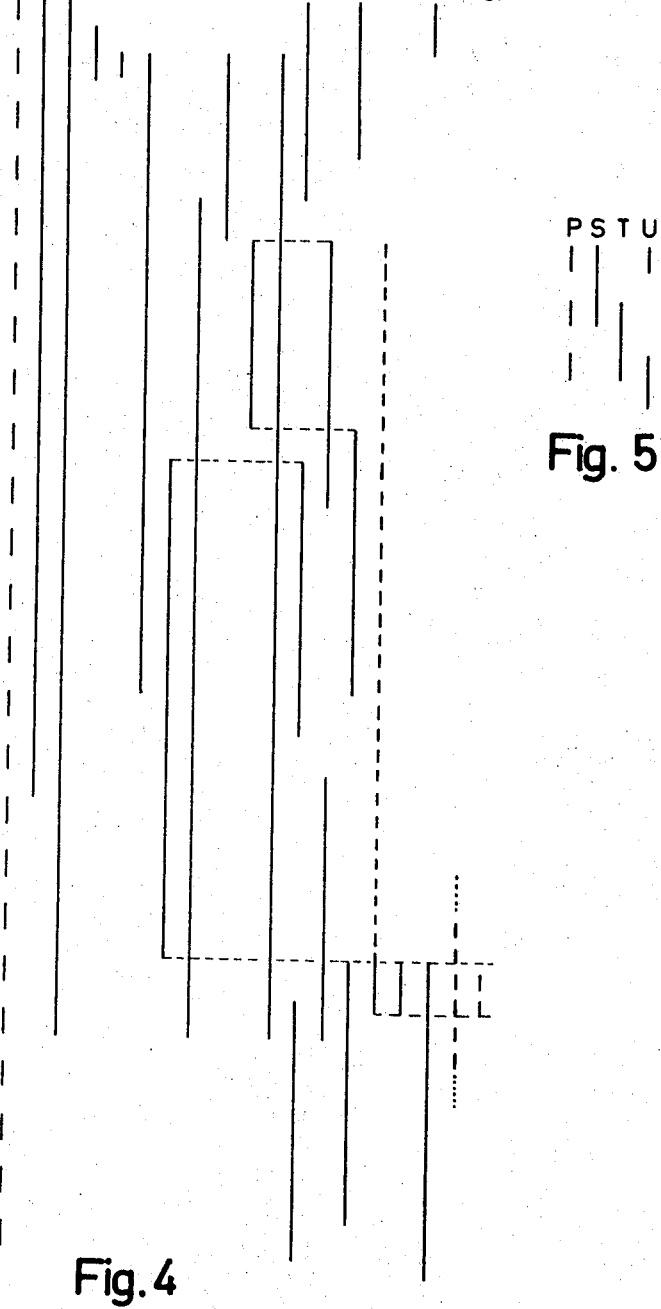

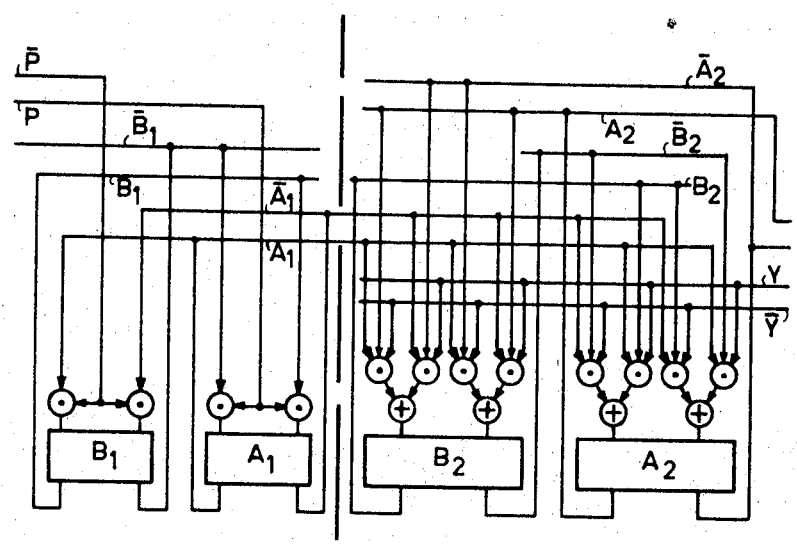
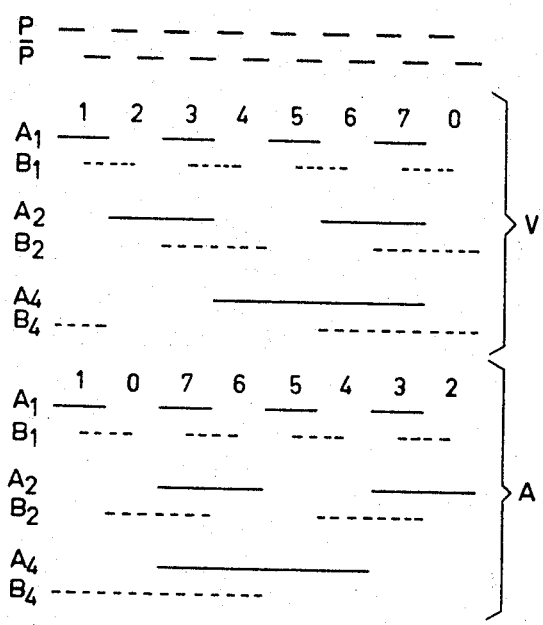
Fig. 7

3,440,410
ARRANGEMENT FOR DIGITALLY ESTABLISHING
THE POSITION OF A MOVABLE OBJECT
Rienk Pieter Offereins, Hengelo, Netherlands, assignor to
N. V. Hollandse Signaalapparaten, Hengelo (Overijsel),
Netherlands, a firm of the Netherlands
Filed Mar. 14, 1966, Ser. No. 534,204
Claims priority, application Netherlands, Mar. 12, 1965,
6503145
Int. Cl. G06g 7/22
U.S. Cl. 235—92        5 Claims This invention relates to an arrangement for digitally establishing the position of a movable object, provided with a system for fine reading and a system for coarse reading coupled thereto, each of these systems comprising an electronic counter that counts pulses or square-wave voltages during a time interval comprised between the moments of occurrence of two electric phenomena, the moment of occurrence of at least one of which is determined by the position to be established.

As a rule both phenomena are either short pulses or the zero-passages of varying voltages or the passage of a predetermined value by such a voltage.

A very effective means for generating such a phenomenon, the moment of occurrence of which is determined by a position to be established, is a synchronous transformer fed by a polyphase voltage and moving in accordance with the object the position of which is to be established. The output voltage of such a synchronous transformer is an alternating voltage the phase of which is a linear function of the position of the movable part of the transformer. The zero-passage of this output voltage as well as the pulses that can be derived by differentiation from this voltage after it has been limited are phenomena the moments of occurrence of which are determined by the position of the object mechanically coupled to the movable part of the synchronous transformer. Furthermore, networks have been conceived that produce a single-phase output voltage the phase of which is determined by the position of the movable part of a synchronous transformer, the single-phase winding of which is fed by an alternating voltage and the polyphase winding of which is connected to corresponding terminals of the network. Networks of this class have even been developed which connected to the polyphase winding of a single-phase fed synchronous transformer, produce two voltages, the phase angles of which change in opposite direction as a linear function of the position of the movable part of the synchronous transformer, so that in the way described above two electric phenomena can be derived from these voltages, the moments of occurrence of which change in opposite direction in accordance with the position of said movable part, so that these phenomena determine an interval the length of which is a measure of the position of said movable part, so that a counter, counting pulses with a constant frequency during this interval, will digitally establish the position of the movable part of the transformer and of the object coupled thereto.

The accuracy of the above method for digitalising a position is restricted. In the first place the change in phase of the output voltage of the synchronous transformer or the network may differ slightly from the change in position of the movable part of the transformer because it is impossible for the distribution of the polyphase windings of the transformer to be sufficiently uniform and moreover the stator- and rotor slots influence the distribution of the magnetic field. Furthermore the accidental situation of the time interval between the phenomena with respect to the fixed moments at which the pulses supplied to the counter occur may influence the measuring result obtained. Insofar as the arrangement is not provided with both a coarse- and a fine measuring system small measuring errors are not very objectionable. Such small errors will only influence the lowest positions or bits so that, even if the arrangement operates in the binary system probably not more than two or three bits will be wrong. The addition of a few positions to the counter will then give certainty that the bits actually required will correspond to the correct rounded-off value. In an arrangement with a coarse- and a fine measuring system relatively small errors in the value produced by the coarse measuring system may result in substantial errors in the value supplied by the arrangement. Such substantial errors will occur in the vicinity of the position where the value produced by the fine system reaches zero and, for instance in a counter operating in the binary system, the value stored in the fine counter changes from a number with only 1 bits into a number with only 0 bits or the reverse. It is then absolutely necessary that simultaneously with said change in the value stored in the fine counter at any rate a change in the value stored in the lowest position of the counter of the coarse system takes place. However, even in the best arrangement this simultaneity cannot be guaranteed, in the first place because the gear train that couples the coarse- and fine synchronous transformers and, as a rule, drives the coarse synchronous transformer, shows a certain amount of backlash, the direction of which depends on the direction of motion. Consequently an error corresponding to the value of the lowest bit of the counter of the coarse system or, what amounts to the same thing, to the value represented by a complete revolution of the synchronous transformer of the fine system will occur in the vicinity of the position in which the counter of the fine system passes zero. This can be elucidated with reference to Table I. This table applies to an arrangement operating in the binary system. It shows side by side successive, simultaneously occurring readings of the coarse and of the fine counter as well as the decimal values of these readings. The left part applies to a system with infinite accuracy, the right part to a system with a slight backlash in the gear train between the synchronous transformers and in which the coarse synchronous transformer consequently lags slightly with respect to its correct position so that after the fine counter has switched over to zero the coarse counter will for some time continue to store the value it stored when the fine counter stored its maximum value.

TABLE I

| Coarse | Fine | | Coarse | Fine | |
|--------|------|---|--------|------|---|
| 00 | 110 | 6 | 00 | 110 | 6 |
| 00 | 111 | 7 | 00 | 111 | 7 |
| 01 | 000 | 8 | 00 | 000 | 0 |
|  |  |  | 01 | 000 | 8 |
| 01 | 001 | 9 | 01 | 001 | 9 |

Consequently, as is shown in the right hand part of the table, when the measured value passes a value for which the fine system obtains the position corresponding to zero, the arrangement will produce, within a small angular interval, the length of which is determined by the backlash in the gear train or other sources of measuring errors a value showing an error corresponding to the value represented by one complete revolution of the synchronous transformer of the fine system.

It is the object of the present invention substantially to avoid errors of the type described above. For this purpose, according to the invention, the counter of the coarse system and the counter of the fine system comprise at least one overlapping position, whilst after the counting operation of these counters has been completed a programming arrangement controls the execution of a comparison of the settings reached by the overlapping parts of these counters, and if inequality has been established, also controls a correction, in the adjustment of the setting of the counter of the coarse system by causing at least the non-overlapping part of this counter to step backward or forward.

In certain embodiments of the invention the correction of the adjustment of the counter of the coarse system is complete and the overlapping part partakes in it. The counter receives counting pulses for this purpose. If the counter is reset to zero before the digitalizing operation is performed the error may be positive as well as negative, and this means that it is necessary for the counter of the coarse system to be able to step forward as well as backward during the correction operation. The direction of the correction is established by comparing the values registered in the overlapping parts of the counters. The stepping of the counter is interrupted as soon as it is established by comparison that the overlapping parts of the counters register the same value.

Counters able to step backward and forward are, however, complicated and expensive. For this reason, in a preferred embodiment of the invention in which the overlapping part of the counter of the coarse system partakes in the correction so that its setting is altered until it has become equal to that of the overlapping part of the fine counter, the counter of the coarse system is not reset to zero before a digitalizing operation is effected, but to a quiescent adjustment that, in the previous cycle of the coarse counter, is reached a few steps before the zero setting whilst the correction is always effected by causing the counter to step forward. The number of steps between the quiescent setting and the zero setting depends on the highest possible value of the error. This will be elucidated below in greater detail. If the quiescent setting is suitably selected the correction can in any case be effected by making the counter step in a forward direction.

Both embodiments described above are effective as means for reducing measuring errors of the type mentioned above and it will be shown below that especially the circuitry of the second embodiment is simple and inexpensive. Both embodiments show, however, the disadvantage that a relatively large number of steps may be required for effecting the correction. If in an embodiment of the second type the maximum error is three units in either direction, and the coarse counter is reset to −4, the highest number of steps required for the correction is 7, and as an average, 4 steps will be necessary to effect the correction. It is, however, by no means necessary for the setting of the overlapping part of the counter of the coarse system to be corrected. The bits or figures registered by this overlapping part of the coarse counter after the correction can just as well be obtained from the overlapping part of the fine counter. Only the carry of a unit to the non-overlapping part of the coarse counter which may occur during the correction is important. For this reason, in further preferred embodiments of the invention the stepping of the counter of the coarse system during the correction is restricted to the non-overlapping part of this counter. It will never be necessary for this part to take more than one step whilst effecting this correction. This reduces the time required for the correction.

It is also in this form of the invention possible to reset the counter in the coarse system to zero before effecting a reading or to reset it to a negative setting as seen in the forward stepping direction of the counter. In an arrangement in which the coarse counter is reset to zero, the comparison of the settings of the overlapping parts of the counters must not only decide whether the setting of the non-overlapping part of the coarse counter is to be altered, but also which direction this alteration must have. It will be elucidated below that a relatively simple combination of "and" and "or" circuits is able to effect said comparison and make this decision If the counter is reset to a suitable negative value correction by stepping backward will never be necessary, and the comparison need only show whether a correction, consisting of an addition of a unit to the value registered in the non-overlapping part of the coarse counter, is required. In this case also the comparison can be effected by a simple combination of "and" and "or" circuits.

In principle it would be possible to reset the coarse counter to a positive value both in an arrangement in which the overlapping part of the coarse counter partakes in the correction as well as in an arrangement in which the correction is restricted to the non-overlapping part of the coarse counter. The amplitude of the shift of the quiescent value must in this case be adapted to the highest possible error in a way similar to that in which a shift to a negative quiescent value is adapted to the maximum possible error. In this case, also the correction in the setting of the coarse counter can always be effected by stepping in one single direction so that no special means are required for establishing the direction of the correction. Nevertheless the coarse counter must be able to step in either direction for the direction of the correction is always opposite to the stepping direction during the normal counting operation. For this reason an arrangement in which the coarse counter is reset to a positive value will rarely be used.

In order that the invention may be more clearly understood, different embodiments of it will now be described by way of example with reference to the drawings accompanying this specification in which:

FIGS. 1, 2 and 3 arranged in this order, the one above the other, show a circuit of an embodiment of the invention.

FIG. 4 is a working diagram of the circuit shown in FIGS. 1, 2 and 3.

FIG. 5 is a working diagram of a part of the circuit shown in FIGS. 1, 2 and 3.

FIG. 7 is a circuit of an electronic counter and its working diagram.

Figure 1:
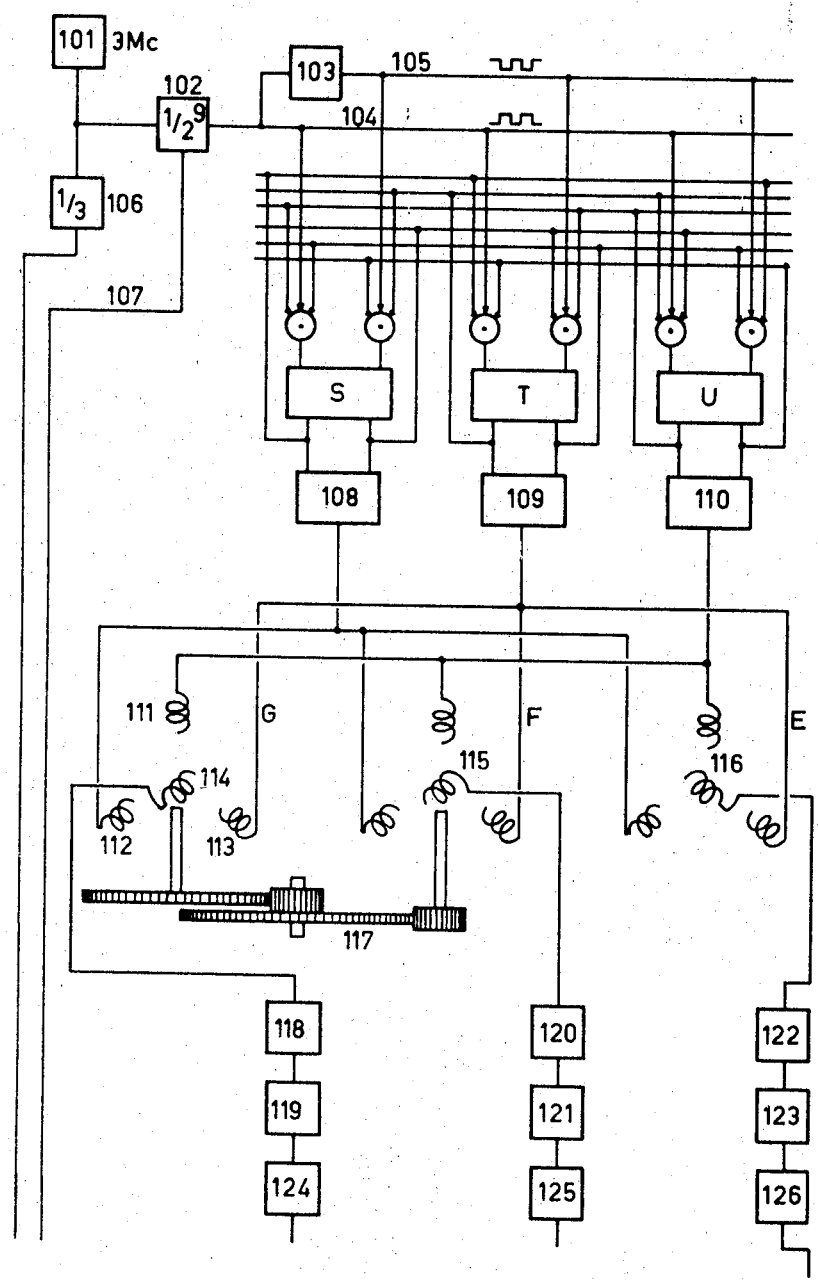

With reference to the FIGS. 1, 2 and 3, which must be arranged in this order the one above the other in order to obtain a complete circuit, a first embodiment of an arrangement according to the invention will now be described. In this embodiment digitalising is effected by means of synchronous transformers that are fed by polyphase square-wave voltages. However, it will be shown that the way in which digitalising is effected does not influence the application of the invention. The digitalising arrangement applied in the embodiment now to be described, is itself described in the British patent application No. 54162/65 of the same applicant. The circuit arrangement is fed by crystal-controlled generator 101 that produces an alternating voltage with a frequency of 3 mc. The frequency of this voltage is divided by $2^9$, in a frequency divider 102 with trigger circuits. This frequency divider consequently supplies square-wave voltages with a frequency of about 6 kc. to the circuit 104. These square-wave voltages control, in the usual way, a ring counter with three positions and three trigger circuits S, T and U. For this purpose the square-wave voltages applied to the conductor 104 are inverted in the inverter 103, which supplies the inverted square-wave voltages thus obtained to the conductor 105. Each trigger circuit in the ring counter, such as T may be set by a square-wave of the square-wave voltage applied to the conductor 104, and reset by an inverted square voltage wave supplied to the conductor 105. The setting and resetting of the trigger circuits in the ring counter is, however, controlled by way of "and" circuits, and as a result of the operation of these "and" circuits, a trigger circuit in the ring counter (such as T) can only be set if the trigger circuit S, that, in cyclic order in the counter, precedes the first mentioned trigger circuit is set, and simultaneously the trigger circuit U which follows in the counter in cyclic order on the said trigger circuit T is reset, whilst a trigger circuit in the ring counter T can only be reset if the trigger circuit U which, in cyclic order in the counter, follows on said trigger circuit T is set, and simultaneously the trigger circuit S that, in cyclic order in the counter, precedes the trigger circuit to be reset is in the reset condition. FIG. 5 shows a time diagram of the pulses P driving the counter, and of the successive states of the trigger circuits of the ring counter. It may be derived from this diagram that the output voltages of the trigger circuits in the ring counter constitute a three-phase square-wave voltage, that is a group of three square-wave voltages, each of which obtains its two possible values during equal intervals, and that show a phase-shift of ⅓ of a cycle with respect to each other. These three-phase square-wave voltages are amplified in the amplifiers 108, 109 and 110, and the output voltages of these amplifiers feed the three-phase windings of three three-phase synchronous transformers G, F and E. Each of these synchronous transformers comprises three primary windings, constituting the three-phase windings and carrying the references 111, 112 and 113 in the transformer G and also one secondary winding which is rotatable with respect to the other windings, and which, in the transformers G, F and E respectively carry the references 114, 115 and 116. The synchronous transformer E supplies the reference voltage which indicates the moment with respect to which the counting must be effected during the digitalising operation. In the digitalizing arrangement it constitutes one of the electric phenomena between which the interval, during which the counter operates, is situated. The synchronous transformer G is a coarse system, the synchronous transformer F is a fine system. In connection therewith the rotors of these synchronous transformers are mechanically coupled by a gear train which reduces the rotational speed of the coarse system with respect to that of the fine system. The synchronous transformer F of the fine system is coupled either directly or by way of another gear train to the object the position of which is to be established. The output voltage of the secondary winding of each of these synchronous transformers is a discontinuous function of time and, without special measures, cannot be applied for controlling the digitalising operation, but if such an output voltage is subjected to the influence of a low-pass filter that only allows a voltage with the fundamental frequency of this output voltage to pass, a sine-shaped voltage is obtained the zero passage of which is an accurate measure of the position of the synchronous transformer from the output voltage of which it is derived. In connection therewith a low-pass filter 118, 120 and 122 is inserted in the output circuit of each of the synchronous transformers, and these low-pass filters substantially suppress all frequencies higher than the fundamental frequency. In the embodiment now described the position of such a synchronous transformer is established by establishing the moment at which the output voltage of such a low-pass filter passes through zero in a predetermined direction. In order to establish this moment very accurately the edge of the voltage curve should be extremely steep in the vicinity of the zero passage, and in connection therewith the output voltages of the low-pass filters are amplified by means of amplifiers 119, 121 and 123. The amplitudes of the output voltages of these amplifiers are, however, so high, that they would damage the circuit arrangements to which they are applied, and for this reason limiter circuits 124, 125 and 126 are inserted in the output circuits of the amplifiers. These limiters produce square-wave voltages and the front edges of these voltages constitute the electric phenomena enclosing the intervals during which the counters are operative. The voltages produced by the limiters connected to the coarse and the fine synchronous transformers will henceforth be called coarse and fine begin square-wave voltages, whilst the voltage produced by the limiter 126 connected to the reference synchronous transformer will be called the end square-wave voltage. In the diagram of FIG. 4 these output voltages are shown as continuous lines as long as such a voltage differs from zero in a predetermined direction. The line BG represents the voltage supplied by the limiter 124 connected to the output circuit of the coarse synchronous transformer G. The line BF shows the corresponding voltage derived from the output voltage of the synchronous transformer for fine reading, whilst line E shows the corresponding voltage produced by the system comprising the reference synchronous transformer E. The digitalising operation will now be described with reference to FIGS. 2 and 3. This operation is controlled by control pulses S that are supplied to the programming circuit shown in FIG. 2 by way of the conductor 107, and are produced by one of the trigger circuits in the frequency divider 102. When a digitalising operation is to be effected a measuring order voltage is applied to the conductor 202, and this voltage instantaneously sets the trigger circuit M (see MO and M, FIG. 4). The next inverted control pulse $\overline{S}$ supplied by the inverter 201 will then set the trigger circuit L by way of the "and" circuit 220 (line L, FIG. 4), provided, however, that the programming circuit arrangement shown in FIG. 2 is at rest. This may be derived from the fact that the trigger circuits DG, DF, AG and AF are reset, and consequently apply voltages to the four remaining input circuits of the "and" circuit 220 that permit this "and" circuit to become conductive. As soon as the trigger circuit L is set, the next uninverted control pulse S can pass the "and" circuit 232, and this pulse is applied as a resetting square-wave voltage by way of conductors 227, 327 to both the coarse counter and the fine counter GT and FT in FIG. 3, resetting these counters to their positions of rest. Moreover this pulse RS sets the trigger circuits AG and AF by way of the "and" circuits 215 and 217, which is possible because the trigger circuits DG and DF are still in their reset conditions (see lines DG and DF, FIG. 4) and apply voltages to said "and" circuits permitting them to let the resetting square-wave pass. The fact that the trigger circuits AG and AF are set shows that the resetting of the counters has started. If the reseting square-wave voltage now comes to an end, so that the counters may be supposed to have reached their positions of rest, the inverter 226 supplies a voltage that resets the trigger circuit L by way of the "and" circuit 221, provided that the trigger circuits AG and AF have actually been set by the resetting square-wave voltage. The arrangement is now ready to start the digitalising operation. Counting must begin at the moment at which the beginning of a begin square-wave voltage BG or BF supplied by the limiters 124 and 125 is received, and the counting operation must therefore be prevented from being started when, at the moment at which a reading order in the form of the reading order voltage mentioned above is received, one of the limiters 124, 125 is accidentally supplying a begin square-wave voltage that began a short time previously. This would lead to an erroneous counting result. For this reason it must first be established that since the reception of the beginning of the reading order at least a part of an interval between two sucessive begin square-wave voltages has occurred. This is the task of the trigger circuits DG and DF. As soon as the trigger circuit AG is set and the resetting square-wave voltage has come to an end, the "and" circuit 211 receives from the trigger circuits AG as well as from the inverter 226 voltages that are such as to make it possible for the voltage, derived by inversion by means of the inverter 205 from the coarse begin square-wave voltage BG supplied by the limiter 124 to the conductor 204, to reach the left-hand control input circuit of the trigger circuit DG in order to set this trigger circuit. This trigger circuit is consequently set as soon as, after the preparatory switching operation described above, no coarse begin square-wave voltage is present (see DG, FIG. 4). This setting occurs either instantaneously after the preparatory switching operations have been effected (if at that moment no begin square-wave voltage is present) or after the begin square-wave voltage that was present at that moment has come to an end. In the same way the voltage derived by inversion in the inverter 207 from the fine begin square-wave voltage BF supplied to the conductor 206 by the limiter 125 will set the trigger circuit DF by way of the "and" circuit 213 (see DG, FIG. 4). The circuit arrangement is now ready to begin the counting operation. As soon as after the completion of the switching operations described above, a coarse begin square-wave voltage BG is applied to the conductor 204, the trigger circuit CG is set by way of the "and" circuit 222 (see CG, FIG. 4). This is possible because the trigger circuits DG and AG are set. In the same way the trigger circuit CF for the fine reading is set by the fine begin square-wave voltage BF (see BF, FIG. 4). The voltage applied by the trigger circuit CF in its set condition to the circuit 231, 331 causes the "and" circuit 306 to become conductive for the counting pulses received from the circuit 314. These counting pulses are derived from the alternating voltage of the generator 101 (FIG. 1), by means of the scale-of-three counter 106. These counting pulses will then cause the fine-counter to step, starting from the quiescent position to which it has already been reset. The trigger circuit CG in its set condition applies a predetermined voltage by way of the circuit 229, 329 and the "or" circuit 304 to the "and" circuit 305, thus making this "and" circuit conductive for the counting pulses received by way of the circuit 314. Consequently these pulses will cause the coarse-counter GT to step. Both counters will consequently start stepping when the beginning of a begin square-wave voltage has been received. The stepping of these counters must be interrupted by resetting the trigger circuits CG and CF as soon as the leading edge of the end square-wave voltage E is received. The trigger circuits CG and CF must, however, be prevented from being reset immediately by an end square-wave voltage that might accidently be present at the moment at which these trigger circuits are set by the respective begin square-wave voltages. For this reason the circuit is arranged in such a way that the trigger circuits CG and CF will only be able to be reset by an end square-wave voltage when, after the start of the counting operation, the occurrence of at least part of an interval between two successive end square-wave voltages E has been established. For this reason the end square-wave voltage supplied by the limiter 126 to the circuit 208 is inverted in the inverter 219. The inverted voltage is applied to the "and" circuits 216 and 218, and if at the moment at which this voltage is received a counting operation is in the course of being effected, so that the trigger circuits CG and CF are set, these trigger circuits apply such voltages to the "and" circuits 216 and 218 that these "and" circuits allow the said inverted end square-wave voltage to pass to the trigger circuits AG and AF which are consequently reset. The following end square-wave voltage received by way of the circuit 208 will then be able to reach the trigger circuits CG and CF by way of the "and" circuits 223 and 225 and reset them. Insofar as the observation of the voltages produced by the synchronous transformers is concerned the digitalising operation is now completed. The trigger circuits L, CG, CF, AG and AF have all returned to their reset conditions. Consequently the "and" circuit 233 will apply a predetermined voltage, henceforth called correction order voltage, to the circuit 230, 330. The task of this correction order voltage is to start the correction of the setting of the coarse counter.

Be it presumed that in the gear train connecting the synchronous transformers to the object the position of which is to be established, the synchronous transformer of the system for fine reading F (henceforth to be called fine synchronous transformer) is nearer to this object than the synchronous transformer of the system for coarse reading G (henceforth to be called coarse synchronous transformer). Because of the backlash in the gear train 117 between the fine synchronous transformer and the coarse synchronous transformer the error in the position of the coarse synchronous transformer will be greater than that in the position of the fine synchronous transformer. As a rule such errors, provided that they are small enough, will have no serious consequences, but in the vicinity of the positions in which the fine synchronous transformer passes through its zero position errors in the measured value corresponding to a complete revolution of the fine synchronous transformer may be expected. This will occur for instance, if, as a result of the backlash, the coarse synchronous transformer shows a slight lag with respect to the position of the fine synchronous transformer, or when irregularities in the windings of the coarse synchronous transformer result in deviations in the phase of the voltage supplied by this transformer. It is the object of the present invention substantially to avoid such errors. For this purpose the coarse counter and the fine counter GT and FT in the embodiment now described are provided with three overlapping positions. The counters used are binary electronic counters, and the three lowest bits of the coarse counter correspond to the three highest bits of the fine counter. If the setting of the coarse counter is completely correct, then the bits stored in the overlapping positions of both counters will have the same values. Should this not be the case then in the embodiment now described the setting of the coarse counter must be corrected within the range covered by the said three bits until the bits stored in the overlapping parts of the counters have become equal. Because the error may be positive as well as negative it would generally speaking be necessary for the coarse counter to be able to step backwards and forwards in effecting the said correction and it would then be necessary for the comparison circuit comparing the settings of the overlapping positions of the counter to be able to establish in which direction the coarse counter will have to step in order to make its overlapping part reach the setting of the overlapping part of the fine counter. Circuit arrangements in which the counter is reset to zero and is able to step in either direction have been conceived, and will be described below, but they are fairly expensive and require a relatively large number of circuit elements especially because of the high price and complicity of the counter. In the embodiment which will presently be described a more simple solution is applied which permits the use of a counter that can only step forwards. In this embodiment the coarse counter does not start its counting operation from zero and before the counting operation is started the coarse counter is not reset to zero value but to a setting that in the previous cycle of the forwardly stepping counter is reached before the zero setting, the difference in these settings being equal to about half the range covered by the overlapping parts of the counters. This can be effected in a very simple way. When a counter is reset to zero, all trigger circuits in this counter are switched over to the conditions corresponding to zero value by applying suitable voltages to predetermined input circuits of these trigger circuits. In the embodiment now described these trigger circuits are switched over in a similar way to other predetermined conditions corresponding to the value that this coarse counter will store in its quiescent condition, from which it will have to take a predetermined number of steps in order to reach the zero value. Be it presumed that the error in the setting of the coarse counter will never be greater than three units corresponding to the lowest bit of the overlapping part of the counter. As a rule a negative error is just as probable as a positive one. For instance, the same backlash in the gear train between the synchronous transformers will be effective in either direction, depending on the direction of motion, and will thus cause an error with the same amplitude with either the one or the other sign. The expected reading of the coarse counter will then be situated within a range of seven units which extends on either side of the correct value. Consequently the range covered by the overlapping part of the counters must also be at least seven units. In the embodiment now described binary counters are applied, and in order to obtain an overlapping range of at least seven units, three binary bits are required. It should never be necessary for the coarse counter to step backwards, and that means that the erroneous value must never be higher than the correct value. This will be the case when the coarse counter is reset to a position reached three or four steps before the zero setting of the counter. If the quiescent condition is reached three steps before the zero setting, then under the most favourable conditions no correction of the setting of the coarse counter will be necessary, whilst under extremely unfavourable conditions the counter will have to take six steps to reach the correct setting. If the quiescent position is reached four steps before the zero setting, then in extremely favourable conditions the coarse counter will have to take one step to reach the correct setting, whilst under extremely unfavourable conditions seven steps will have to be taken. In any case the range covering all possible settings remains within the complete range of the overlapping part. The conditions of the three trigger circuits storing the three bits stored in the overlapping part of the coarse counter are compared with the conditions of the corresponding trigger circuits in the fine counter by means of the comparison circuit shown in FIG. 3 below the counters GT and FT. This comparison operation will be elucidated in the case of the trigger circuits 307 and 308. These trigger circuits store the lowest bit in the overlapping part of the counters. If trigger circuit 307 is set and trigger circuit 308 is reset by way of "and" circuit 310 and "or" circuits 311 and 312, a voltage differing from the quiescent voltage is supplied to the circuit 316. If, on the contrary, the trigger circuit 307 is reset whilst the trigger circuit 308 is set, then, by way of "and" circuit 309 and "or" circuits 311 and 312, a voltage differing from the quiescent value is supplied to the same circuit 316. In this way a voltage differing from the quiescent value is supplied to the circuit 316 if not all pairs of trigger circuits storing corresponding bits in the overlapping parts of the counters are in corresponding conditions. If, however, in each pair of trigger circuits storing corresponding bits the conditions of the trigger circuits are the same, then no "and" circuit in the comparison circuit will supply a voltage differing from the quiescent value to the circuit 316, so that this circuit will obtain its quiescent potential.

Be it now assumed that, after the counting has been effected, the conditions of the trigger circuits storing the overlapping bits in the coarse—and fine counter are actually equivalent. The circuit 316 then obtains a voltage equal to the quiescent value. This voltage is inverted in the inverter 302, and the inverted voltage is supplied to the "and" circuit 301. Because this "and" circuit still receives, by way of the circuit 330, the correction order voltage supplied by way of the "and" circuit 233 and, moreover, the trigger circuit W is in its reset condition, the voltage supplied by the inverter 302 will reach the circuit 328 and start the operations which eventually return the complete circuit arrangement to its quiescent condition. It will be described below how this is effected. If the pairs of overlapping bits are not equivalent then the circuit 316 receives a potential differing from the quiescent potential, and under this condition the voltage supplied by the inverter circuit 302 cannot pass the "and" circuit 301. The voltage differing from the quiescent value supplied to the circuit 316 can, however, pass the "and" circuit 315, which is conductive for this voltage because its second input circuit still receives the correction order voltage supplied by the "and" circuit 233. Consequently the trigger circuit W is set. By way of "or" circuit 304 this trigger circuit makes the "and" circuit 305 once more conductive for counting pulses, so that the coarse counter GT is caused to step forwards. As soon as the binary bits stored in the overlapping parts of the counters have, as a result of this stepping, reached corresponding values, the voltage applied to the circuit 316 will return to its quiescent value and the trigger circuit W will then be reset by the output voltage of the inverter circuit 302 inverting the quiescent voltage of the circuit 316. In order that the counter will receive the last pulse completely, the resetting of the trigger circuit W is made to depend, by way of "and" circuit 303 on the output voltage of the inverter 313 that inverts the counting pulses. Consequently the trigger circuit W can only be reset in the pulse interval following on the pulse that caused the equal setting of the overlapping parts of the counters. As soon as the trigger circuit W has reached its reset condition, the "and" circuit 305 interrupts the connection between the source of counting pulses and the coarse counter, whilst the left input circuit of the "and" circuit 301 then receives such a voltage that the inverted voltage supplied by the inverter 302 can reach the circuit 328 in order to cause the resetting of the complete arrangement to its quiescent condition. In the programming circuit shown in FIG. 2 this voltage, applied to the circuit 228 makes the "and" circuit 209 conductive for inverted control pulses supplied by the inverter 201. Should the measuring order voltage still be present on the circuit 202, at this moment, then nothing happens for the time being. As soon, however, as this order voltage has been removed, the inverter 203 applies such a voltage to the left-hand input circuit of the "and" circuit 210 that the inverted control pulses supplied by way of the "and" circuit 209 can reach the right hand input circuit of the trigger circuit M and reset this circuit. In its reset condition the trigger circuit M supplies by way of its right hand output circuit, a predetermined voltage to input circuits of the "and" circuits 212 and 214, and because, moreover, the trigger circuits AG, CG, AF and CF are reset, said "and" circuits can supply the voltage received from the trigger circuit M to the right control circuits of the trigger circuits DG and DF, so that these trigger circuits are also reset. The complete arrangement has then reached its quiescent condition.

The transfer of the values stored in the counters to a data handling system can be initiated by the programming circuit shown in FIG. 2. For this purpose, in a preferred embodiment of the invention, the output circuit of the "and" circuit 209 is connected to said data handling system instead of to the input circuit of the "and" circuit 210. Consequently, as soon as the setting of the counters and the correction thereof has been completed, this data handling system receives the inverted control pulses supplied by way of said "and" circuit 209, and these pulses will control the data handling system to initiate the transfer. After the transfer has been completed, the data handling system applies in this embodiment a voltage differing from the quiescent value to the upper input circuit of the "and" circuit 210, in this way initiating the resetting of the complete arrangement to its quiescent condition in the way described above. Other forms of arrangements according to the invention may, however, be conceived. In a certain embodiment the voltage supplied by way of the "and" circuit 301 to the circuit 328 initiates the transfer of the values stored in the counters GT and FT to a buffer. After this transfer has taken place the arrangement itself is reset to its quiescent condition. In this embodiment the digitalising arrangement may be ready to effect a new digitalising operation even before the data handling system is ready to receive the measuring results obtained. The data handling system can successively initiate the transfer of the values stored in the buffer to its own storage and elaborate them.

It will now be described how, in an arrangement of the type described above, in which the counter of the coarse system is reset to −4 before a digitalising operation takes place, the correction of the setting of the non-overlapping part of the coarse counter is effected by causing, if necessary, the carry of a unit to said part of this counter. In order to be able to conceive such an arrangement, it is necessary to investigate each combination of settings of the two overlapping parts of the counters so as to determine whether the complete correction of the setting of the coarse counter including its overlapping part would require the carry of a unit to its non overlapping part. In Table II this investigation is elaborated in the case of an arrangement with binary counters and three overlapping binary bits.

TABLE II

| Setting of the overlapping part of the fine counter | Setting of the overlapping part of a coarse counter that has been reset to −4 | | | | | | | | | | | | | |
|---|---|---|---|---|---|---|---|---|---|---|---|---|---|---|
| | Add 1,000 | | | | | | | No addition | | | | | | |
| 000 | 111 | 110 | 101 | 100 | 011 | 010 | 001 | | | | | | | 000 |
| 001 | 111 | 110 | 101 | 100 | 011 | 010 | | | | | | | 001 | 000 |
| 010 | 111 | 110 | 101 | 100 | 011 | | B | | | | | 010 | 001 | 000 |
| 011 | 111 | 110 | 101 | 100 | | D | | | | | 011 | 010 | 001 | 000 |
| 100 | 111 | 110 | 101 | A | | | | | | 100 | 011 | 010 | 001 | 000 |
| 101 | 111 | 110 | | F | | | | | 101 | 100 | 011 | 010 | 001 | 000 |
| 110 | 111 | | E | | | | | 110 | 101 | 100 | 011 | 010 | 001 | 000 |
| 111 | | G | | | | | 111 | 110 | 101 | 100 | 011 | 010 | 001 | 000 |

The left column comprises all possible settings of the overlapping part of the counter of the fine system. The right-hand part of the table comprises all possible settings of the overlapping part of the coarse counter, the upper left triangular field in the right part comprise all settings of the non overlapping part of the coarse counter which require the carry of a unit in the case of their simultaneous occurrence with the setting of the overlapping part of the fine counter present on the same line, whilst the lower right triangular field of the right part of the table comprise all settings of the coarse counter for which no such carry is required if they occur simultaneously with the fine counter setting present on the same line. It is easy to draft such a table. It is only necessary to consider each combination of settings and to establish whether a complete correction would require a carry or not. The combinations of settings that, according to Table II, require the addition of a unit to the value stored in the non-overlapping part of the coarse counter can be established by a combination of seven "and" circuits with no more than four input circuits each and one "or" circuit with seven input circuits or an equivalent combination of "or" circuits. In the table the settings of the coarse counter that require a carry are arranged in groups, each group enclosed in a rectangle indicated by a capital letter present near its lower right hand vertex. The group A comprises all combinations in which the digit with the highest denomination stored in the overlapping part of the coarse counter is 1, and the digit with the highest denomination stored in the overlapping part of the fine counter is 0.

The presence of a combination belonging to this group can, therefore, be established by an "and" circuit with two input circuits. Henceforth the three overlapping bits stored in the fine counter will be called $F_1$, $F_2$ and $F_3$, $F_1$ being the bit with the highest denomination, whilst the overlapping bits stored in the coarse counter are called $G_1$, $G_2$ and $G_3$, $G_1$ being the bit with the highest denomination. The "and" circuit which establishes the presence of a combination belonging to the group A receives voltages corresponding to $\overline{F_1}$ and $G_1$. The group B is added to the group A by establishing whether a combination of settings is present in which the bits $F_1$ and $F_2$ are 0 and the bit $G_2$ is 1. The occurrence of this group can be established by means of an "and" circuit with three input circuits. It also establishes the presence of a few combinations belonging to the group A, but that is no objection. In such a case the voltage which initiates the carry is received from more than one "and" circuit, which does not prevent the correct operation. Careful consideration of the Table II shows that the circuit arrangement that can be represented by the Boolean formula:

$$\overset{A}{\overline{F_1}\cdot G_1} + \overset{B}{\overline{F_1}\cdot \overline{F_2}\cdot G_2} + \overset{C}{\overline{F_1}\cdot \overline{F_2}\cdot \overline{F_3}\cdot G_3} + \overset{D}{\overline{F_1}\cdot \overline{F_3}\cdot G_2\cdot G_3}$$
$$\overset{E}{+\overline{F_1}\cdot \overline{F_2}\cdot G_1\cdot G_2} + \overset{F}{\overline{F_2}\cdot \overline{F_3}\cdot G_1\cdot G_3} + \overset{G}{\overline{F_3}\cdot G_1\cdot G_2\cdot G_3} \quad (1)$$

will supply a voltage differing from the quiescent value in all cases in which a carry must be effected. Each term in this formula represents a separate "and" circuit, which selects the group indicated by the same capital letter.

Figure 6:
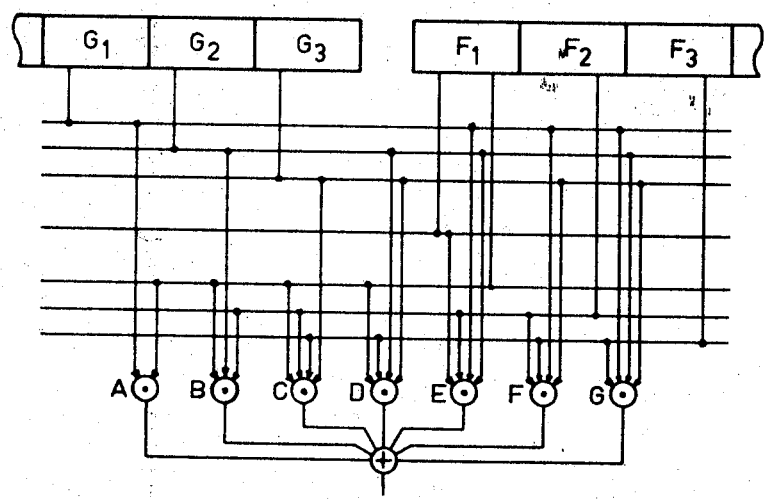
FIG. 6 is a circuit arrangement for comparing positions of counters.

FIG. 6 shows the combination of "and" and "or" circuits represented by this formula. In this figure $F_1$, $F_2$ and $F_3$ indicate the trigger circuits in the counter for fine reading storing the three overlapping bits, whilst $G_1$, $G_2$ and $G_3$ indicate the three trigger circuits in the counter for coarse reading storing the three overlapping bits. Comparison with the Boolean formula shows that this circuit can actually be represented by this formula.

Table III relates to an arrangement in which the coarse counter is reset to zero. Consequently this counter must be able to step backwards as well as forwards.

TABLE III

| Setting of the fine counter | | Setting of the coarse counter (reset to 0) | | | | | | | | | | | |
|---|---|---|---|---|---|---|---|---|---|---|---|---|---|
| I | II | III add 1000 | | | IV | | | V | VI | | | VII subtract 1000 | | |
| 000 | 100 | 101 | 110 | 111 | | | | 000 | 001 | 010 | 011 | | | |
| 001 | 101 | 110 | 111 | | | | 000 | 001 | 010 | 011 | 100 | | | |
| 010 | 110 | 111 | | | | 000 | 001 | 010 | 011 | 100 | 101 | | | |
| 011 | 111 | | | | 000 | 001 | 010 | 011 | 100 | 101 | 110 | | | |
| 100 | 000 | | | | 001 | 010 | 011 | 100 | 101 | 110 | 111 | | | |
| 101 | 001 | | | | 010 | 011 | 100 | 101 | 110 | 111 | | | | |
| 110 | 010 | | | | 011 | 100 | 101 | 110 | 111 | | | | 000 | 001 |
| 111 | 011 | | | | 100 | 101 | 110 | 111 | | | | 000 | 001 | 010 |

Be it presumed that both counters are binary counters and that the overlapping parts comprise three bits. Column I shows the settings of the overlapping part of the fine counter. The other columns show various settings of the overlapping part of the coarse counter. Column II shows the setting of the coarse counter that cannot occur simultaneously with the setting of the fine counter present on the same line because of the accuracy of the digitalising arrangement. Column III shows a number of settings of the overlapping part of the coarse counter which, if they occur simultaneously with the setting of the fine counter present in the same line, require the addition of a unit to the value stored in the non overlapping part of the coarse counter. The columns IV, V and VI show the settings of the overlapping part of the coarse counter which do not require a carry if they occur simultaneously with the settings of the fine counter present on the same line. The column VII comprises all settings of the overlapping part of the coarse counter which, if they occur simultaneously with the setting of the fine counter present on the same line, require a carry consisting of the subtraction of a unit from the value stored in the non overlapping part of the coarse counter. This table also may be drafted by considering all possible combinations of counter settings. The combinations of settings that require the addition of a unit to the value stored in the non overlapping part of the coarse counter as well as the combinations requiring the subtraction of a unit from said value can, each of them, be established by means of a separate circuit arrangement consisting of three "and" circuits and one "or" circuit. These circuit arrangements can be represented by the Boolean Formulae 2 and 3.

$$\overline{F}_1.\overline{F}_3.G_1.G_2.G_3 + \overline{F}_1.\overline{F}_2.G_1.G_2 + \overline{F}_1.\overline{F}_2.\overline{F}_3.G_1.G_3 \quad (2)$$

$$F_1.F_3.\overline{G}_1.\overline{G}_2.\overline{G}_3 + F_1.F_2.\overline{G}_1.\overline{G}_2 + F_1.F_2.F_3.\overline{G}_1.\overline{G}_3 \quad (3)$$

Figure 9:
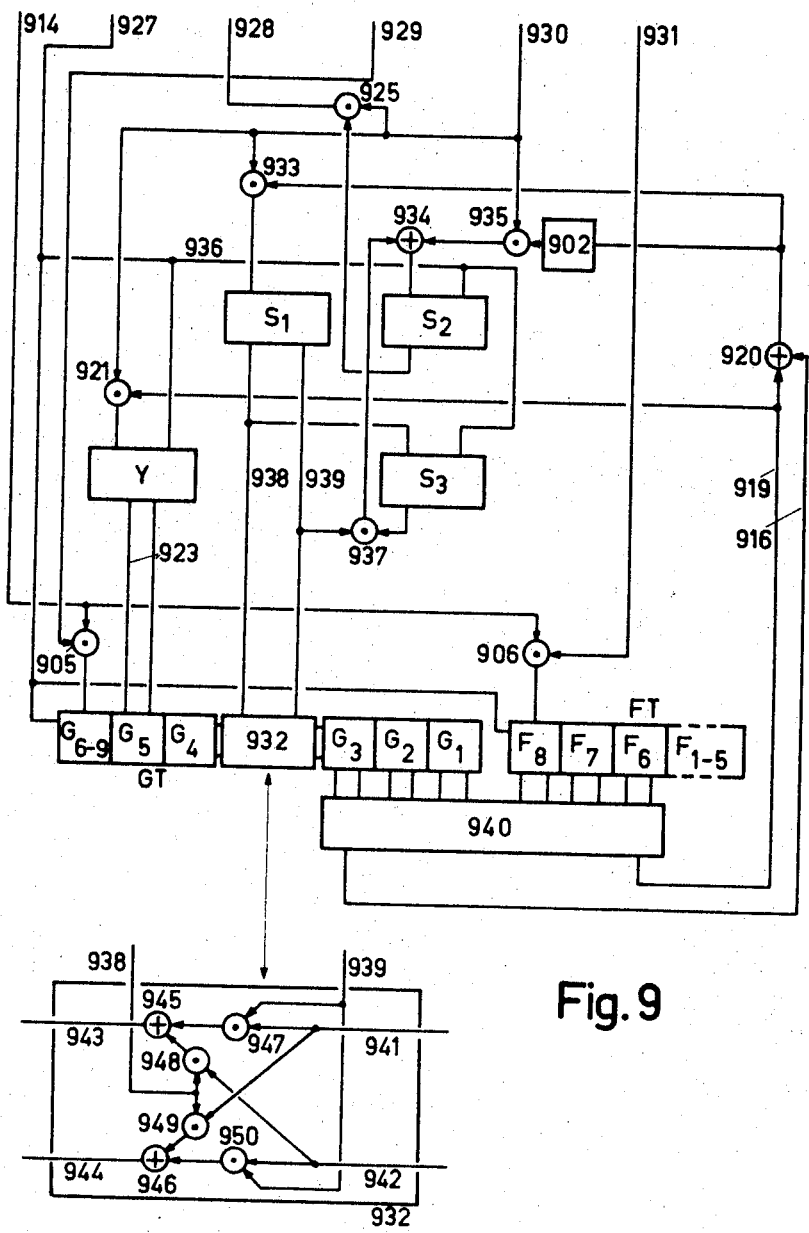

Referring to FIG. 9 an arrangement will now be described in which the coarse counter is reset to $-4$ and the correction is effected by adding a unit to the value stored in the non-overlapping part of the coarse counter. The circuit arrangement according to FIG. 9 is actually one in which the coarse counter is reset to zero, and in which, consequently, the coarse counter must be able to run backwards and forwards. If, however, the trigger circuit Y, the "and" circuit 921, the "or" circuit 920 and the circuit 919 are removed from the circuit arrangement and the circuit 916 is directly connected to the right input circuit of "and" circuit 933, a simplified circuit arrangement is obtained in which the coarse counter needs only be able to step forwards. A complete circuit of the arrangement of which FIG. 9 shows a part is obtained if the figures 1, 2 and 9 are arranged the one above the other in this sequence. The operation of the part shown in the FIGURES 1 and 2 does not change when these parts cooperate with the circuit according to FIG. 9 instead of with the circuit according to FIG. 3. Consequently it is not necessary to describe the operation of the circuits shown in FIGS. 1 and 2 in said combination because this description would be a repetition. The resetting of the two counters to their quiescent positions is effected in the way already described by a reset pulse received by way of the circuit 227, 927. The same reset pulse controls, by way of the circuit 936, a number of other switching operations, especially the resetting of the trigger circuits $S_2$ and $S_3$. During the digitalising operation the coarse counter receives pulses that reach this counter by way of the circuit 914 and the "and" circuit 905 made conductive for these pulses by a voltage supplied by way of the circuit 229, 929. In a similar way the fine counter receives counting pulses by way of the "and" circuit 906, made conductive for these pulses by a voltage received by way of the conductor 231, 931. After the completion of the digitalising operation the conductor 230, 930 receives a correction order voltage in the way already described in connection with the arrangement according to FIGS. 1, 2 and 3. This correction order voltage initiates the correction operation. In effecting this correction it may be necessary to inject a pulse into the non-overlapping part of the coarse counter. Various methods could be applied for this purpose, and in the circuit now described a special circuit arrangement 932 for this purpose, henceforth called pulse injecting circuit, is inserted between the pair of trigger circuits $G_3$ that stores the third bit in the overlapping part of the coarse counter and the pair of trigger circuits $G_4$ that stores the fourth bit in the coarse counter, and is consequently part of the non-overlapping part of this counter. During the counting operation square-wave voltages flow through this connection effecting the carry between the third and the fourth position of the coarse counter. As long as no carry takes place, one conductor in this connection has a high potential and the other a low potential. During the carry operation these potentials are interchanged temporarily by the previous pair of trigger circuits. In the circuit arrangement now described the same interchange of potential between the third and fourth position can also be caused by the pulse injecting circuit 932. This pulse injecting circuit is shown in detail in the lower half of FIG. 9. This part of the figure shows the conductors 941 and 942 connecting the previous pair of trigger circuits $G_3$ to the pulse injecting circuit as well as the conductors 943 and 944 that lead to the next pair of trigger circuits $G_4$. As long as no pulse needs to be injected, the conductor 939 has a high potential whilst the conductor 938 has a low potential. Furthermore the previous pair of trigger circuits supplies either a high potential to the conductor 941 and a low potential to the conductor 942 or a low potential to the conductor 941 and a high potential to the conductor 942, depending on the condition reached. Be it assumed, that the high potential is applied to the conductor 941. As long as no pulse injection takes place the high potential applied to the conductor 941 can pass the "and" circuit 947 and the "or" circuit 945 in order to reach the conductor 943, whilst the conductor 944 automatically obtains a low potential. When the third pair of trigger circuits controls a carry to the fourth pair then temporarily a high potential is applied to the conductor 942 whilst a low potential is applied to the conductor 941. Said high potential reaches, by way of the "and" circuit 950 and the "or" circuit 946, the conductor 944, whilst the conductor 943 automatically obtains a low potential. Consequently the carry pulse is actually transmitted by the pulse injecting circuit to the fourth pair of trigger circuits $G_4$. Should it be necessary, for the purpose of correction, to supply a pulse to the non-overlapping part of the coarse counter, that is, to the pair of trigger circuits $G_4$ which stores the lowest bit in the non-overlapping part, then, temporarily, a high potential is applied to the conductor 938 and a low potential to the conductor 939. If, at this moment, the conductor 941 has a high potential and the conductor 942 a low one, then the high potential can no longer pass the "and" circuit 947 to the conductor 943, that consequently obtains a low potential. On the other hand the high potential applied to the conductor 938 makes the "and" circuit 949 conductive for the high potential received by way of conductor 941, so that this high potential can reach the conductor 944 by way of this "and" circuit 949 and the "or" circuit 946. Obviously the connections between the conductors 941 and 942 on the one hand and the conductors 943 and 944 on the other hand are interchanged for as long as the conductor 938 has a high potential and the conductor 939 a low one. The temporary interchange has the same effect as the supply of a carry pulse. If at the moment at which the correction is effected the conductor 942 should accidentally have a high potential and the conductor 941 a low one, then the pulse-injecting circuit 932 operates in a corresponding way. Also in this case the temporary interchange of the potentials of the conductors 938, 939 causes a temporary interchange of the connections between the pairs of trigger circuits $G_3$ and $G_4$ and consequently the addition of an extra unit to the value stored in the non-overlapping part of the coarse counter.

In the embodiment shown in FIG. 9 in its simplified form the comparison arrangement 940 comprises the comparison circuit shown in FIG. 6. This comparison circuit applies a high potential to conductor 916 should it be necessary to supply an extra carry pulse to the non-overlapping part of the coarse counter. Be it first assumed that no such extra carry is required. The low potential of the conductor 916 then results in a high potential of the output circuit of the inverter 902. The conductor 930 still has the high potential corresponding to the correction order, so that the voltage supplied by the inverter 902 can pass the "and" circuit 935 and reach, by way of the "or" circuit 934, the left input control circuit of the trigger circuit $S_2$, causing this trigger circuit to be set. Both input circuits of the "and" circuit 925 then obtain a high potential that under these circumstances is supplied by way of conductor 928 to the "and" circuit 209 in order to initiate in the way already described the resetting of the complete arrangement to its quiescent condition. The trigger circuit $S_2$ will not be reset at this moment; resetting of this trigger circuit takes place simultaneously with the resetting of the counters. The fact that the trigger circuit $S_2$ remains in its set condition does not prevent the circuit arrangement from reacting to the next measuring order voltage received by way of conductor 202, for this order voltage immediately removes the influence of the high potential of the conductor 928, 228 on the trigger circuit M by lowering the potential applied to the left input circuit of the "and" circuit 210 by way of the inverter 203. As soon as the setting of the trigger circuit M has caused the setting of the trigger circuit L, the high potential is removed from the conductor 928, 228, because the left input circuit of the "and" circuit 233 then obtains a low potential, whilst, moreover, the resetting pulse initiated by the setting of the trigger circuit L resets the trigger circuit $S_2$.

Let it now be presumed that the correction requires a carry to the non-overlapping part of the coarse counter. In this case the comparison circuit 940 applies a high potential to the conductor 916. This potential passes the "and" circuit 933, which is conductive because it still receives the correction order voltage from the conductor 930, reaches the left control input circuit of the monostable trigger circuit $S_1$ and sets it. This monostable trigger circuit controls the pulse injecting circuit 932 and causes it to supply, in the way described above, a carry pulse to the non-overlapping part of the coarse counter, for as long as the monostable trigger circuit $S_1$ is in its set condition. Moreover, the output voltage of the monostable trigger circuit $S_1$ in its set condition sets the trigger circuit $S_3$. As soon as the monostable trigger circuit $S_1$ has returned to its reset condition, and consequently, the correction by injecting a carry pulse has been effected, a high potential again is applied to the conductor 939 and the left input circuit of the "and" circuit 937, making this circuit conductive for the high potential applied to its right input circuit by the trigger circuit $S_3$ in its set condition. This potential sets the trigger circuit $S_2$ by way of the "or" circuit 934. In the way already described above the trigger circuit $S_2$ in its set condition initiates the return of the complete arrangement to its condition of rest. For the time being the trigger circuits $S_3$ and $S_2$ remain in their set conditions. They are reset before the next counting operation by the resetting pulse for the counters GT and FT, which reaches the right input control circuits of these trigger circuits by way of the conductor 936.

With reference to the unsimplified FIG. 9 an arrangement will now be described in which the coarse counter is reset to its zero position, so that it may be necessary for the carry pulse supplied to the non-overlapping part of the coarse counter GT to cause this counter to step backwards. Counters that are able to step forwards and backwards are well-known in the art but for the sake of completeness an example of such a counter will be elucidated with reference to FIG. 7. This figure shows the lowest position and the second position of a binary counter, each position comprising a pair of trigger circuits A and B. The condition of the trigger circuit A in each pair is a measure of the bit stored by the pair. By way of conductor P the counter receives the pulses to be counted, and by way of the conductor $\overline{P}$, the inversion of these pulses. It may be derived from the figure that a pulse P sets a trigger circuit $A_1$ if the trigger circuit $B_1$ is reset, and resets it if the trigger circuit $B_1$ is set. On the other hand an inverted pulse $\overline{P}$ sets the trigger circuit $B_1$ if the trigger circuit $A_1$ is set, whilst it resets the trigger circuit $B_1$ if the trigger circuit $A_1$ is reset. In the diagrams of FIG. 7 the dotted line P represents the pulses to be counted and applied to the pair of trigger circuits $A_1$, $B_1$. The dotted line $\overline{P}$ represents the inverted pulses applied to the same pair of trigger circuits. The lines $A_1$ and $B_1$ show the conditions of the trigger circuits $A_1$ and $B_1$ during the counting operation. The pulses or square-wave voltages supplied by the two output circuits of the trigger circuit $A_1$ are used to control the second pair of trigger circuits in the same way as the pulses P and $\overline{P}$ control the first pair. It is obvious that the pulses supplied by the right output circuit of the trigger circuit $A_1$ are the inversions of the pulses supplied by the left output circuit. It is to be noted that the trigger circuit $A_1$ of the first pair must always be switched over by a pulse P to the condition other than that in which it was when it received the pulse. This must be the case when the counter steps forwards as well as when the counter steps backwards, so that it is not necessary for the first pair of trigger circuits in a counter to be switched over in accordance with the stepping direction. All other pairs of trigger circuits, however, must be switched over, and this switch-over is controlled by potentials applied to the conductors Y and $\overline{Y}$, the first of which carries the control potential, whilst the other carries the inverted control potential. Depending on whether the conductor Y or the conductor $\overline{Y}$ receives a high potential, a pair of trigger circuits reacts in a different way to the pulses received from the previous pair of trigger circuits. If the conductor $\overline{Y}$ has a high potential, then each trigger circuit in a pair is controlled by way of the first and the third "and" circuit belonging to that trigger circuit, whilst, if the conductor Y has a high potential, each trigger circuit is controlled by way of the second and fourth "and" circuit, these "and" circuits being counted from left to right. The control of these trigger circuits can be described in a very simple way by means of Boolean formulae. For each trigger circuit $A_n$ and $B_n$ of the $n^{th}$ pair of trigger circuits in the counter the Formulae 4, 5, 6, 7 are valid.

$$A_n \text{ set} = \overline{Y}.\overline{A}_{n-1}.\overline{B}_n + Y.A_{n-1}.B_n \qquad (4)$$

$$A_n \text{ reset} = \overline{Y}.\overline{A}_{n-1}.B_n + Y.A_{n-1}.\overline{B}_n \qquad (5)$$

$$B_n \text{ set} = \overline{Y}.A_{n-1}.A_n + Y.\overline{A}_{n-1}.\overline{A}_n \qquad (6)$$

$$B_n \text{ reset} = \overline{Y}.A_{n-1}.\overline{A}_n + Y.\overline{A}_{n-1}.A_n \qquad (7)$$

The first term of each formula relates to stepping forwards, the second term to stepping backwards. $A_{n-1}$ and $B_{n-1}$ describe the conditions of the trigger circuits in the $n-1^{th}$ pair. In both stepping directions of the counter the next formulae apply to the first pair of trigger circuits:

$$A_1 \text{ set} = P.\overline{B}_1 \qquad (8)$$

$$A_1 \text{ reset} = P.B_{\cdot 1} \qquad (9)$$

$$B_1 \text{ set} = \overline{P}.A_1 \qquad (10)$$

$$B_1 \text{ reset} = \overline{P}.\overline{A}_1 \qquad (11)$$

Diagrams indicated by V in FIG. 7 show the cooperation of three successive pairs of trigger circuits in a counter that operates in the forward direction. The diagrams indicated by A in the same figure show this cooperation in a counter that steps backwards. Each line in these diagrams is indicated by the reference sign of the trigger circuit to which said line applies. The presence of a line in the diagram shows that the trigger circuit to which said line applies is set. If it is taken into consideration that the values of the bits stored by the three successive pairs of trigger circuits are 1, 2 and 4 then it is easy to derive from the diagrams indicated by the reference A that the counter operating according to this diagram counts backwards, that is in the sequence 7, 6 ,5, 4, 3 ,2, 1, 0.

It is to be noted that the overlapping part of the fine counter does not partake in the correction operation. Consequently this overlapping part need not be able to step backwards, and in the arrangement shown in FIG. 9 this part of the counter can only step forwards, no means for reversing the stepping direction being provided for this part. The pair of trigger circuits $G_4$ stores the lowest bit in the part of the counter that must be able to step backwards. Consequently this pair need not have a reversible stepping direction, either. The stepping direction of all other pairs of trigger circuits must be reversible. The trigger circuit Y controls the reversal of the stepping direction of this part of the counter, and for this reason the two output circuits of this trigger circuit supply the potentials required for determining the stepping direction to conductors in the reversible part of the coarse counter corresponding to the conductors Y and $\overline{Y}$ in FIG. 7. If the trigger circuit Y is in the reset state the counter steps forward. Prior to the start of the digitalising operation the trigger circuit Y is reset simultaneously with the trigger circuits $S_2$ and $S_3$ by the voltage pulse that resets the two counters to their quiescent conditions. During the digitalising operation the coarse counter consequently steps forwards. After the digitalising operation has been completed the arrangement 940 establishes whether the setting of the coarse counter must be corrected, and if so, in which direction. For this purpose the arrangement 940 comprises two systems of "or" and "and" circuits that can be described by the Boolean Formulate 2 and 3 in col. 13.

If no correction is necessary the arrangement 940 applies low potentials to both the conductors 916 and 919. Under these circumstances the output potential of the "or" circuit 920 is low and the output potential of the inverter 902 high, so that by way of the "and" circuit 935, which conducts because the conductor 930 still applies the correction order potential to its upper input circuit, the output potential of the inverter sets the trigger circuit $S_2$, which then initiates the various operations already described in connection with the simplified figure which cause the complete arrangement to return to the quiescent condition. If a correction in forward direction is required, the conductor 916 receives a high potential which, by way of the "or" circuit 920, reaches the "and" circuit 933 and, by setting the monostable trigger circuit $S_1$ initiates the injection of a carry pulse into the non-overlapping part of the coarse counter. In both cases the trigger circuit Y remains in the reset condition. Should a correction require a subtractive carry to the non-overlapping part of the coarse counter, the conductor 919 receives a high potential from the arrangement 940, whilst the potential of the conductor 916 remains low. This high potential sets the trigger circuit Y by way of the "and" circuit 921, the upper input circuit of which receives the high correction order potential from the conductor 930, so that this "and" circuit is conductive. Moreover, by way of the "or" circuit 920 and the "and" circuit 933, the high potential applied to the conductor 919 reaches the monostable trigger circuit $S_1$, and sets it, so that in the way described above a carry pulse is injected into the non-overlapping part of the coarse counter. As a result of the reception of this pulse the non-overlapping part of the coarse counter will take a step backwards because the trigger circuit Y is set. It is possible that the setting of the trigger circuit Y needs a little more time than the setting of the monostable trigger circuit $S_1$, as a result of which the carry pulse reaches the counter before this counter has been switched over to stepping backwards. This, however, is not very important, for the carry pulse controls only the pair of trigger circuits $G_4$ directly, and this pair of trigger circuits need not be switched over to stepping backwards. The second pair of trigger circuits, which are the first to be switched over, receive its pulses from the trigger circuits of the first pair in the non-overlapping part of the coarse counter, and this pair needs a certain time interval to react to the carrying pulse. It may, consequently, be taken for granted that before the first pair have reacted to the carry pulse the switch-over of the trigger circuit Y and the reversal of the stepping direction has been completed. Complete certainty in this respect can be obtained by a further elaboration of the circuitry. For this purpose the voltage supplied by the comparison arrangement 940 to the "and" circuit 933 and the monostable trigger circuit $S_1$ is not obtained by way of the "or" circuit 920 but from a separate "or" circuit, one input circuit of which is connected directly to the conductor 916 for correction in a forward direction but the other input circuit of which is connected to the conductor 919 for backward correction by way of a special "and" circuit that will only be conductive when the trigger circuit Y is in its set condition, so that, when correcting in a backward direction, no carry pulse can be injected before the switch-over to stepping backwards has been completed.

Figure 8:
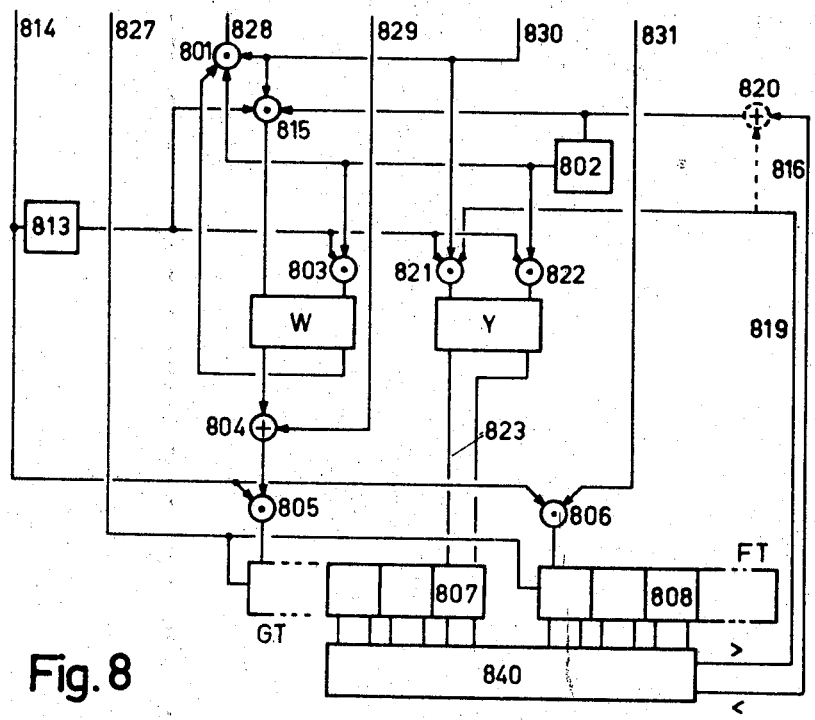
FIGS. 8 and 9 show circuit arrangements for effecting the correction according to the invention.

Finally an arrangement will be described in which also the setting of the overlapping part of the counter is completely corrected, and in which the coarse counter is reset to zero, so that the complete coarse counter must be able to step backwards and forwards. A complete circuit of this type is obtained when the figures 1, 2 and 8 are arranged the one above the other in this sequence. In this arrangement the parts of the circuitry shown in the FIGS. 1 and 2 operate exactly in the way already described in the case of cooperation with the circuit shown in FIG. 3, so that no description of this part of the arrangement need be given.

A system of this type can be arranged in various ways. In one embodiment the comparison arrangement 840, which compares the settings of the overlapping parts of the counters, comprises in the first place a comparison circuit of the type shown in FIG. 3, which establishes whether either the overlapping parts of the counter have reached the same setting, so that no correction is necessary, or these parts have different settings, in which case a high potential is applied to the conductor 816. Moreover the arrangement 840 in this embodiment comprises a combination of "and" and "or" circuits which applies a high potential to the conductor 819 if the coarse counter must step backwards in effecting the correction. The combinations of settings which require a backward or a forward correction may be derived from Table III. In this table the column I comprises all possible settings of the overlapping part of the fine counter. The columns III and IV comprise all settings of the overlapping part of the coarse counter which require a forward correction if they occur simultaneously with the setting of the overlapping part of the fine counter present on the same line. If the settings of the overlapping part of the coarse counter present in the columns VI and VII occur simultaneously with the settings of the overlapping part of the fine counter present on the same line, the coarse counter must step backward during the correction. Because of the accuracy of the arrangement the settings of the overlapping part of the coarse counter present in column II cannot occur simultaneously with the settings of the overlapping part of the fine counter present on the same line, whilst moreover the column V comprises the settings of the overlapping part of the coarse counter that are equal to the settings of the overlapping part of the fine counter, so that they require no correction. In order to establish whether the coarse counter must step backwards during the correction it would be possible to decode the settings of the overlapping parts of the two counters by means of "and" circuits. Sixteen "and" circuits are required for this purpose, eight for each counter. Each "and" circuit allotted to the coarse counter has three input circuits, each of which is connected to an output circuit of a different trigger circuit in the overlapping part of the coarse counter, and this is effected in combinations that are such that for each setting of the overlapping part of the coarse counter the output circuit of one of these "and" circuits which is allotted to this setting, obtains a voltage differing from its quiescent value. The "and" circuits allotted to the fine counter are arranged in the same way, with this exception, however, that each "and" circuit has a fourth input circuit that is connected to the output circuit of a corresponding "or" circuit with three input circuits. These three input circuits of an "or" circuit, allotted in this way to a certain setting of the overlapping part of the fine counter, are connected to output circuits of the "and" circuits allotted to settings of the overlapping part of the coarse counter, which, when they occur simultaneously with the setting of the overlapping part of the fine counter to which the "or" circuit is allotted, require a backward correction of the coarse counter. The output circuit of an "and" circuit allotted to a predetermined setting of the overlapping part of the fine counter consequently obtains a voltage differing from the quiescent value if the overlapping part of the fine counter has this setting and if, moreover, the overlapping part of the coarse counter has one of the settings that, if they occur simultaneously with said setting of the overlapping part of the fine counter, require a correction in backward direction. The output circuits of the "and" circuit allotted to the fine counter are combined to one single output circuit by means of one or more "or" circuits, and this combined output circuit obtains a voltage differing from the quiescent value and initiating a correction in a backward direction if the combination of settings reached by the overlapping parts of the counters require such a backward correction. This circuit arrangement for establishing that a backward correction is necessary requires sixteen "and" circuits and nine to twelve "or" circuits, depending on the permissible number of input circuits of an "or" circuit. Other circuit arrangements for the purpose of establishing that a backward correction is necessary, and that require a smaller number of circuit elements, can, however, be conceived. A circuit arrangement which only comprises twelve "and" circuits and one to four "or" circuits is described by the following Boolean formula:

$$\overline{F}_1.\overline{F}_2.\overline{F}_3.\overline{G}_1.G_3+\overline{F}_1.F_3.G_1.\overline{G}_2.\overline{G}_3+\overline{F}_1.\overline{F}_3.\overline{G}_1.G_2.G_3$$
$$+\overline{F}_1.F_2.\overline{F}_3.G_1.\overline{G}_3+F_1.\overline{F}_2.\overline{F}_3.G_1.G_3+F_1.F_3.\overline{G}_1.\overline{G}_2.\overline{G}_3$$
$$+F_1.\overline{F}_3.G_1.G_2.G_3+F_1.F_2.F_3.\overline{G}_1.\overline{G}_3+\overline{F}_1.\overline{F}_2.\overline{G}_1.G_2$$
$$+\overline{F}_1.F_2.G_1.\overline{G}_2+F_1.\overline{F}_2.G_1.G_2+F_1.F_2.\overline{G}_1.\overline{G}_2 \quad (12)$$

Figure 2:
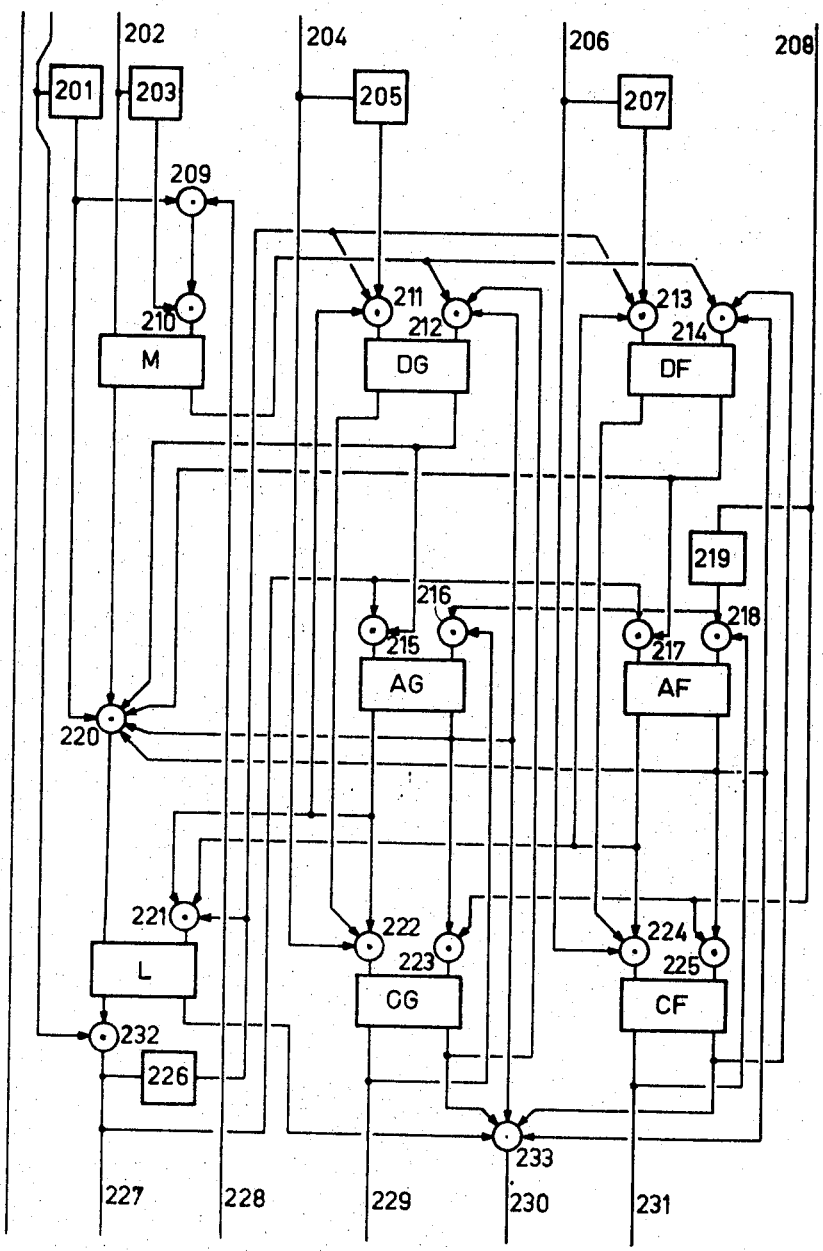
Figure 3:
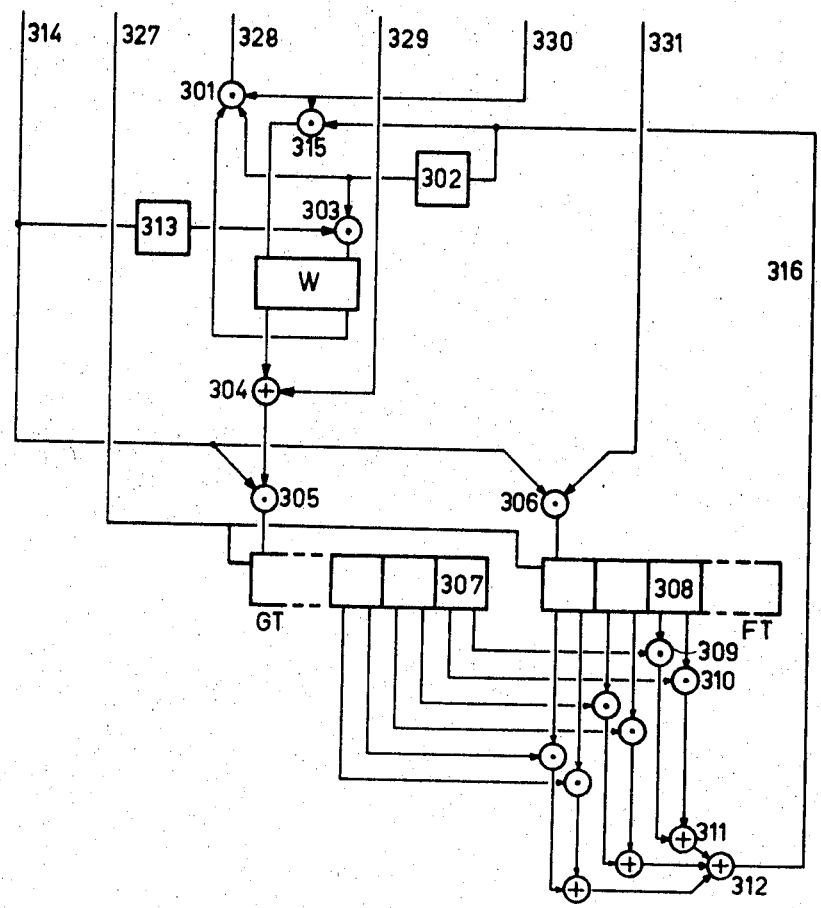

It is not necessary to describe the operation of the circuit arrangement according to the FIGURES 1, 2 and 8 in the case of either a correction in a forward direction or no correction being required, for under these circumstances said circuit arrangement operates in the same way as the circuit arrangement according to the FIGS. 1, 2 and 3, with this slight exception, however, that the setting of the trigger circuit W, which controls the supply of pulses for the correction, is made to depend on the presence of a counting pulse interval by means of the inverter 813 that supplies inverted counting pulses and the "and" circuit 815, so that the trigger circuit W can only be set during such a pulse interval. In the case of a forward correction this measure is not necessary; when a correction in a backward direction is effected, this measure cannot, however, be dispensed with, as will be shown below. The operation of the circuit arrangement according to the FIGS. 1, 2 and 8 will only be described in detail in the case of a backward correction being effected. In this case the comparison arrangement 840 supplies a high potential to the conductor 816 because the settings of the overlapping parts of the counters differ, and a high potential to the conductor 819 because the correction must be effected in a backward direction. The high potential of the counter 816 sets the trigger circuit W by way of the "and" circuit 815. The high potential applied to the conductor 819 sets the trigger circuit Y by way of the "and" circuit 821. The "and" circuits 815 and 821 both possess an input circuit receiving the inverted counting pulses from the inverter 813, so that the setting of these trigger circuits can only be effected during a counting pulse interval. Consequently the setting of the trigger circuit Y will certainly have been completed when the "and" circuit 805, having received a high potential from the trigger circuit W in its set condition by way of the "or" circuit 804, permits the next counting pulse to pass to the coarse counter. In this way, the coarse counter is prevented from taking its first step in the wrong direction as a result of slow operation of the trigger circuit Y. Such a step in the wrong direction might result in equal settings of the overlapping parts of the counters, after which the correction of the setting of the coarse counter would be interrupted at a moment at which this coarse counter would not yet have reached the correct setting. In the way described with reference to FIG. 7 the trigger circuit Y reverses the stepping direction of the coarse counter. As soon as the overlapping parts of the two counters have reached corresponding settings, the high potentials applied to the conductors 816 and 819 are removed, causing the output voltage of the inverter 802 to become high. Then in the next counting pulse interval, so that the counter will always receive complete pulses, the trigger circuit W is reset by way of the "and" circuit 803, whilst the trigger circuit Y is reset in a circuit passing through the "and" circuit 822. After being reset, the trigger circuit W applies a high potential to the left input circuit of the "and" circuit 801. Moreover, the lower input circuit receives a high potential from the inverter 802 because the conductor 816 has a low potential, whilst the high correction order potential is still applied by conductor 830 to the right hand input circuit of said "and" circuit. Consequently the "and" circuit 801 supplies a high potential to the conductor 828, 228 and, in the way described above, this causes the complete circuit arrangement to be returned to its quiescent condition.

In another embodiment according to the invention the comparison arrangement 840 comprises two combinations of "and" and "or" circuits; one of these combinations establishes whether a correction in a forward direction is required, the other combination establishes whether a correction in the backward direction must take place.

In order to establish whether a correction in a backward direction is required, in certain embodiments of this character a circuit arrangement of the type already described, and in which the settings of the overlapping parts of both counters are decoded, is applied whilst a similar circuit arrangement establishes whether a correction in forward direction is required. In circuit arrangements of the latter type the three input circuits of an "or" circuit allotted to a predetermined setting of the overlapping part of the fine counter are connected to the output circuits of the "and" circuits allotted to these settings of the overlapping part of the coarse counter, which, if they occur simultaneously with the setting of the overlapping part of the fine counter to which said "or" circuit is allotted, require a correction of the setting of the coarse counter in a forward direction. The two circuit arrangements referred to above need only be provided with one common set of "and" circuits for decoding the settings of the overlapping parts of the coarse counter, so that these two circuit arrangements together require 24 "and" circuits and at least 18 "or" circuits. In another comparison arrangement a circuit arrangement according to Formula 12 establishes whether a correction in backward direction is required whilst another circuit arrangement, that can be represented by the Boolean formula:

$$\overline{F}_1.\overline{F}_2.\overline{F}_3.G_1.G_3+\overline{F}_1.F_3.\overline{G}_1.\overline{G}_2.\overline{G}_3+\overline{F}_1.\overline{F}_3.G_1.G_2.G_3 \\ +\overline{F}_1.\overline{F}_2.\overline{F}_3.\overline{G}_1.\overline{G}_3+\overline{F}_1.\overline{F}_2.\overline{F}_3.\overline{G}_1.G_3+\overline{F}_1.F_3.G_1.\overline{G}_2.\overline{G}_3 \\ +F_1.\overline{F}_3.\overline{G}_1.G_2.G_3+F_1.\overline{F}_2.\overline{F}_3.G_1.\overline{G}_3+\overline{F}_1.\overline{F}_2.G_1.G_2 \\ +\overline{F}_1.F_2.\overline{G}_1.\overline{G}_2+F_1.\overline{F}_2.\overline{G}_1.G_2+F_1.F_2.G_1.\overline{G}_2$$

(13)

establishes whether a correction in forward direction is required. This circuit arrangement can be derived by considering columns VI and VII of Table III. These two circuit arrangements together comprise 24 "and" circuits and 2 to 8 "or" circuits. In all cases in which the comparison arrangement comprises a part related to forward correction and a part related to backward correction this comparison arrangement has two output circuits, one of which obtains a potential differing from the quiescent value if a forward correction is required, whilst the other output circuit obtains a potential differing from the quiescent potential if a backward correction is required. If FIG. 8 relates to such an embodiment, these output circuits are respectively the output circuit 816 and the output circuit 819. In this case only one of the circuits 816 and 819 has a high potential if a correction is required so that it is necessary that also the high potential applied to the conductor 819 should be able to set the trigger circuit W, and for this purpose in an embodiment of this type an "or" circuit 820 shown in FIG. 8 in dotted lines, must be present, this "or" circuit permitting a high potential applied to conductor 819 to reach the left control circuit of trigger circuit W by way of "and" circuit 815, and to set the trigger circuit, in this way starting the correction. If a correction in forward direction is required, a high potential is applied to the conductor 816 and by way of the "or" circuit 820 and the "and" circuit 815, this potential reaches the trigger circuit W and sets it. The trigger circuit Y remains in its reset condition because the "or" circuit does not permit the high potential applied to conductor 816 to reach this trigger circuit. Consequently the coarse counter is now driven forwards by the pulses received by way of the "and" circuit 805 that has been made conductive for these pulses by the trigger circuit W in its set condition. As soon as the correct position has been reached, arrangement 840 no longer applies a high potential to one of its output circuits 819 or 816 and high potential is removed from conductor 816 as a result of which the input circuit of the inverter 802 obtains a low potential, so that in the way described above, the trigger circuit W is reset, and the supply of counting pulses to the coarse counter is interrupted. If a correction in backward direction is required, the conductor 819 receives a high potential that reaches the trigger circuit W by way of the "or" circuit 820 and the "and" circuit 815 and sets it. Moreover, this same potential sets the trigger circuit Y by way of the "and" circuit 821. The coarse counter GT receives stepping pulses in this case also, but because the trigger circuit Y is set, it now steps backwards. As soon as the overlapping parts have reached corresponding positions, the high potential is removed from the conductor 819, and this initiates the resetting of the trigger circuits W and Y in the way described above. After a correction in either forward or backward direction has been effected, a voltage initiating the return of the complete arrangement to its quiescent condition is applied to the circuit 828 in the way described above.

It needs no elucidation that the comparison circuit described with reference to FIG. 3 can be arranged in another way. In a certain embodiment of such a comparison circuit each pair of corresponding output circuits of corresponding trigger circuits in the two overlapping parts are connected to two input circuits of an "and" circuit. In this way twice as many "and" circuits are obtained as there are pairs of corresponding trigger circuits in the two overlapping parts. The output circuit of such an "and" circuit obtains a high potential if the two trigger circuits to which it is connected are in the same condition, and a low potential if these trigger circuits are in different conditions. The output circuits of all these "and" circuits are combined by means of one or more "and" circuits to a common output circuit, and this output circuit will consequently only have a high potential if the two overlapping parts have completely corresponding settings. Even if the settings of one pair of corresponding trigger circuits are not the same, said output circuit will obtain a low potential. As may be derived from the above, the dependence of the potential on the equality or non-equality of the setting is reversed as compared with the circuit arrangement of FIG. 3, and for this reason the situation of the inverter, such as 302 in FIG. 3 must be changed in an arrangement operating with such a comparison circuit. In FIG. 3 the inverter must be removed from the connection to the "and" circuits 303 and 301 whilst it must be inserted in the connection to the "and" circuit 315.

After having taken cognizance of the above it will be easy to understand that the application of the invention is by no means restricted to digitalising arrangements with synchronous transformers. Other digitalising methods with coarse and fine reading can be used in arrangements according to the invention. In a certain embodiment of a digitalising equipment in which the invention can be applied two rotary arms are mechanically coupled to the object, the position of which is to be digitally established, a gear train between these arms causing a certain amount of rotation of one of these arms to correspond to a substantially larger motion of the object than the same amount of rotation of the other arm. The latter arm belongs to the fine reading equipment and the former to the coarse reading equipment. The position of each of these arms is scanned by scanning arms rotating at a constant angular velocity around the same axes as the arms coupled to the object. Each time such a continuously rotating arm passes the arm with which it is coaxial a pulse is generated either by a contact or by means of a capacitive or inductive arrangement. These pulses, combined with a reference pulse, control the digitalising operation.

It is to be noted that trigger circuits are shown in the figures in a well-known symbolic representation, that is, as a rectangle with two control circuits entering it at the upper side and two output circuits leaving it at the under side. It is presumed that a trigger circuit is set by applying a high potential to the left input control circuit, and reset by applying a high potential to the right input control circuit, and that furthermore in its set condition the trigger circuit supplies a high potential to its left output circuit and a low potential to its right output circuit, whilst in its reset condition it applies a low potential to its left output circuit and a high potential to its right output circuit. It needs no elucidation that the application of the invention is not restricted to the use of this type of trigger circuits. Furthermore it is assumed that the "and" and "or" circuits react to potential increases, but it would also be possible to apply "and" and "or" circuits, operating just the other way about, and reacting to potential decreases.

Furthermore the application of the invention is not restricted to an arrangement operating in the binary system, although all examples described operate in this system. However, the invention can also be applied to digitalising equipments operating in other systems, such as the decimal system. Should another system than the binary system be applied, then the comparison circuit must be adapted to this system, but this raises no problem. If a decimal system is used, probably one overlapping position will suffice, because the range within which the measured value will be situated will, as a rule, be smaller than that of one position in the decimal system.

The invention can also be applied when, in the connection between the object the position of which must be established digitally and the transmitters of the coarse and fine reading system, the coarse reading transmitter is nearer to the object than the fine reading transmitter. In such an arrangement the relative error in the value produced by the coarse system is smaller than that in the value produced by the fine system. Nevertheless it may be advantageous to apply the invention because the application of the invention at any rate ensures that no error corresponding to a complete revolution of the fine transmitter system will ever occur.

The position of rest of the coarse transmitter need not be situated in the centre of the overlapping range. The length of the overlapping range partially depends on the base of the number system applied. In a decimal system the overlapping range cannot be smaller than ten, whilst in a binary system with three overlapping bits this overlapping range is eight. When, in an arrangement operating in the decimal system the largest possible error is two, the overlapping range nevertheless remains ten. In order that the correction may be effected in the smallest possible time interval, it is desirable for the position of rest of the counter to be situated as near as possible to the zero position, and when the largest possible error is smaller than half of said range, it is consequently desirable for the position of rest to be situated nearer to the zero position than the middle of the overlapping range.

As a rule, the range within which the value registered by the coarse counter may be expected to be situated is smaller than the overlapping range. This raises no problem in arrangements in which the correction of the setting of the coarse counter consists in causing this coarse counter, including its overlapping part, to step forwards. The counter simply steps until the overlapping parts of both counters have reached the same settings. Problems may arise, however, in arrangements in which forward as well as backward correction may be necessary, and also in arrangements in hich the correction is restricted to the non-overlapping part of the coarse counter. As a rule it may be assumed that the largest possible positive error is equal to the largest possible negative error. Furthermore, for simplicity's sake, it is assumed that the value of such a maximum error is an integer. In this case the range in which the value stored in the coarse counter may be expected to be situated, corresponds to an odd number of units. In most cases the digitalising arrangement operates either in the binary system or in the decimal system and then the overlapping range always comprises an even number of units. If the examination of the position reached by the overlapping part of the coarse counter is restricted to the range in which the stored value may be expected to be situated, then consequently at least one unit of the overlapping range does not partake in the control of the correction. It may be easily established that in the Tables II and III this is actually the case. If the overlapping range comprises 8 units and the range within which the stored value may be expected to be situated 7, then one unit of the overlapping range does not partake in the control of the correction. This may be considered to be a regrettable fact, but in an effort to let said unit partake in the control it should not be forgotten, that, in principle, this 8th unit may be situated at either end of the said range in which the value stored in the coarse counter may be situated. If the circuit arrangement concerned is one in which a correction is effected by making the counter step in either the one or in the other direction it cannot be derived with certainty from this 8th unit in which direction the correction should be effected, and if the correction is restricted to the non-overlapping part of the coarse counter it cannot be derived with certainty from said 8th unit whether the carry should be effected in the positive or in the negative sense. If it is desired to let the 8th unit partake in the control of the correction, then it must first be presumed that said 8th unit will always be situated at a predetermined end of said range. This supposition having been made it is easy to elaborate a comparison circuit for this case. It is possible that an "incorrect" correction may be effected in this way from time to time, but as a rule the said unit will only be made to partake in the control of the correction if, for some reason, for instance because the position of rest has been shifted, there is a direction for the error which is more likely, so that actually the remaining unit will probably be situated at a predetermined end of the range.

What I claim is:

1. Arrangement for digitally establishing the position of a movable object, provided with a system for fine reading and a system for coarse reading coupled thereto, each of these systems comprising an electronic counter that counts pulses or square-wave voltages during a time interval comprised between the moments of occurrence of two electric phenomena, the moment of occurrence of at least one of which is determined by the position to be established, wherein the counter of the coarse system and the counter of the fine system comprise at least one overlapping position, whilst after the counting operation of these counters has been completed a programming arrangement controls the execution of a comparison of the settings reached by the overlapping parts of these counters, and if inequality has been established, also controls a correction in the adjustment of the setting of the counter of the coarse system by causing at least the non-overlapping part of this counter to step backwards or forwards.

2. Arrangement according to claim 1, wherein the counter of the system for coarse reading steps only in a forward direction (that is in the same direction as during the counting operation) when its setting is corrected, and is not reset to zero setting before the counting operation is effected, but to a quiescent setting, situated in the cycle of the overlapping part of this counter, that, seen in the stepping direction, immediately precedes the zero setting, and is removed at least as many steps as corresponds to the maximum reading error of the coarse system from the zero setting of the counter as well as from the beginning of said cycle.

3. Arrangement according to claim 2, wherein the counter of the system for coarse reading receives counting pulses under the control of the programming arrangement during the correction operation, for as long as the comparison arrangement establishes a difference in setting of the overlapping parts of the counter of the system for coarse reading and of the counter of the system for fine reading.

4. Arrangement according to claim 2, wherein the correction of the setting of the counter of the system for coarse reading is restricted to that of the part of this counter that does not overlap the counter of the system for fine reading, and the comparison arrangement for comparing the settings of the overlapping parts of the counters derives from these settings whether a complete correction of the setting of the counter of the system for coarse reading would require a carry of a unit to the non-overlapping part of this counter, in which case the programming arrangement controls the supply of a pulse to this non-overlapping part.

5. Arrangement according to claim 1, wherein the counter of the system for coarse reading is reset to zero before the counting operation is effected, the correction of the setting of the counter of the system for coarse reading is restricted to that of the part of this counter that does not overlap the counter of the system for fine reading, and the comparison arrangement for comparing the settings of the overlapping parts of these counters derives from these settings whether a complete correction of the setting of the counter of the system for coarse reading, including that of the overlapping part, would require a carry of a unit to the non-overlapping part of this counter, and which direction this carry would have, in which case the programming arrangement controls the supply of a pulse to this non-overlapping part and, if necessary, the reversal of its stepping direction during during this supply.

References Cited

UNITED STATES PATENTS

| 3,024,986 | 3/1962 | Strianese. |
| 3,105,142 | 9/1963 | Tripp. |
| 3,248,622 | 4/1966 | Kelling _____ 235—151.11 |
| 3,370,289 | 2/1968 | Hedgcock. |

MAYNARD R. WILBUR, *Primary Examiner.*

G. J. MAIER, *Assistant Examiner.*

U.S. Cl. X.R.

318—18; 340—146.2, 347